UNITED STATES PATENT OFFICE.

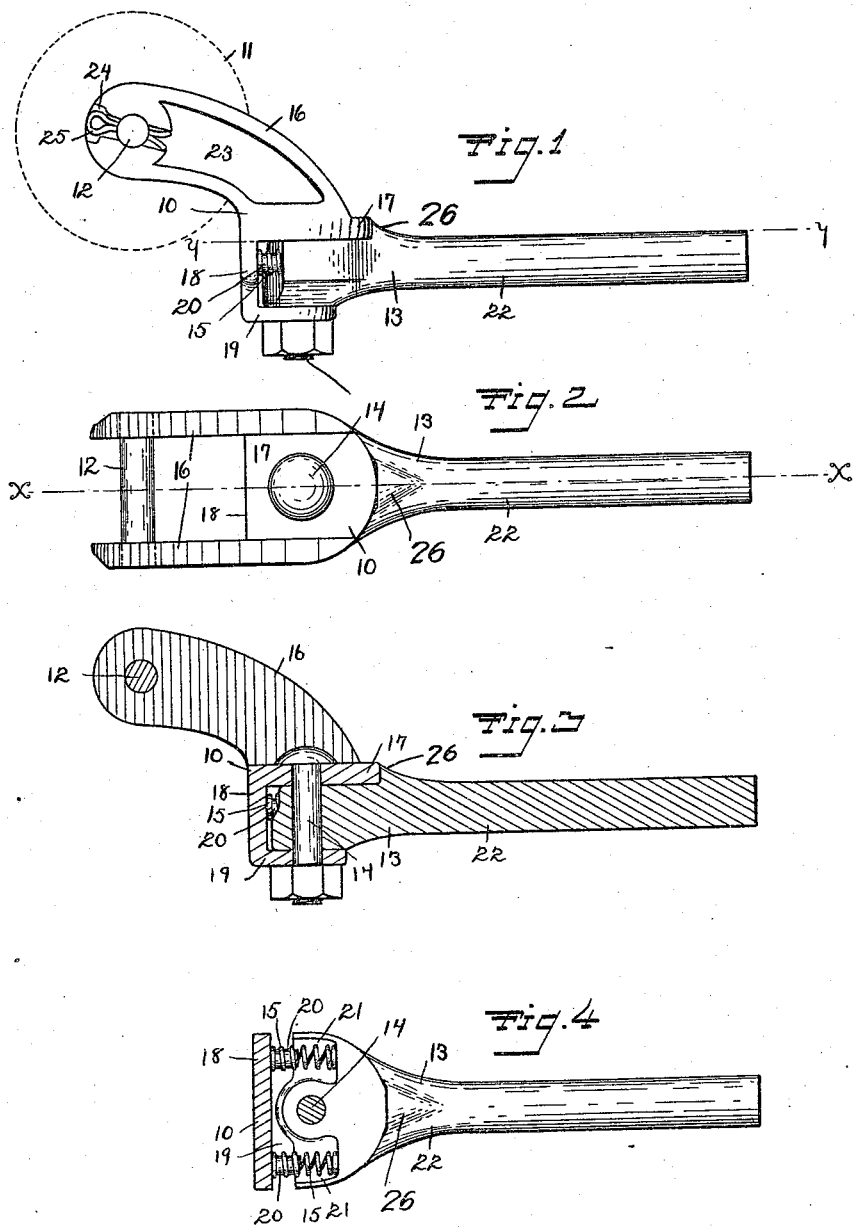

FRED I. HODGE, OF MIDDLETOWN, CONNECTICUT, ASSIGNOR OF ONE-HALF TO HARTWELL LAMBERTSON, OF MIDDLETOWN, CONNECTICUT.

WHEEL-MOUNT.

1,184,098.   Specification of Letters Patent.   Patented May 23, 1916.

Application filed May 14, 1914. Serial No. 838,537.

*To all whom it may concern:*

Be it known that I, FRED I. HODGE, a citizen of the United States, residing at Middletown, in the county of Middlesex and State of Connecticut, have invented certain new and useful Improvements in Wheel-Mounts, of which the following is a specification.

My invention relates to improvements in trolley harps, and the object of my improvement is simplicity and economy in construction and convenience and efficiency in use, and to produce a trolley harp that is particularly adapted to permit the trolley wheel to take curves easily and with a minimum of friction and wear.

Figure 1 is a side elevation of my improved trolley harp and connected parts, the trolley wheel being shown in broken lines. Fig. 2 is a plan view of the same. Fig. 3 is a sectional view on the line $x$ $x$ of Fig. 2. Fig. 4 is a sectional view on the line $y$ $y$ of Fig. 1.

My trolley harp comprises a harp member 10 which pivotally supports the trolley wheel 11 on a shaft 12 and a shank member 13 pivotally connected thereto by a pivotal pin 14 and provided with a pair of cushioning springs 15, that serve to normally position the said members relatively the one to the other and which permit of a limited rotative movement thereof.

The harp member 10 comprises a forked or U shaped upper portion consisting of a pair of curved, parallel arms 16 extending generally upwardly and rearwardly from the platform 17 the upper ends of which support the shaft 12 for the trolley wheel 11 and below the said platform 17 there is a downwardly extending wall 18 at the rear end and from the lower end of which there is a lower forwardly extending platform 19 in parallelism with the upper main platform 17. The platforms 17 and 19 are provided with suitable holes for the pivotal pin 14, and which pin is secured in position therein in any ordinary manner.

On the front face of the front wall 18 of the lower or body portion of the harp member 10 there is a pair of integral projections or studs 20 which support the front ends of the springs 15.

The body or head portion of the shank member 13 fits in the space between the platforms 17 and 19, and has a hole suitable to receive the pivotal pin 14, and is provided with a pair of recesses 21, one on each side of the axis suitable to house the main body portion and the front portion of the springs 15. For convenience in construction the recesses 21 are made open on the upper side and the springs 15 are positioned slightly above the middle of the space mentioned between the platforms 17 and 19. Extending forwardly from the body or head portion of the shank member 13 is a shank 22 of ordinary form, suitable for being connected to the end of the trolley pole. The shank member 13 adjacent the junction of the shank 22 and the head or body portion is provided on the upper side with a lug or filler portion 26 that fits around the rear portion of the upper platform 17, as shown in Figs. 1 and 3, suitably to serve as a guard to prevent the trolley cord or rope from coming in contact with the said platform 17.

The arms 16 of the harp member 10 may be paneled at the outer sides as shown at 23, and the outer face at the upper end may be provided with a groove 24 extending across the hole or bore for the shaft 12 in which is housed a cotter pin 25 for holding the shaft 12 non-rotatively as well as axially in position relatively to the said arms 16.

The rear end of the shank member 13 is spaced a short distance from the opposed wall 18 of the harp member 10 suitably to permit of a limited rotative movement of the said members, so that as the trolley goes around a curve, the wheel being in trailing position, the harp member 10 can swing to one side or the other as the case may be and assume a proper trailing position. The result is less wear on the trolley wheel, at the flanges of the groove, and better operative conditions generally. The springs 15 serve as cushioning springs to cushion the movement of the harp member, and they are effectively disposed to operate in this manner as will be noted, being one on each side of the axial pin 14 and in a plane at right angles thereto. Furthermore, the construction described is particularly compact and efficient.

It will be noted that the upper platform 17 is a plate-like structure that serves as a yoke for cross-connecting the trolley wheel supporting arms 16, as a hinge knuckle member for engaging with the pivotal pin 14, and also serves as a closure for the recesses 21 in which the springs 15 are housed, which latter as described are provided in the head portion of the shank member 13 and are open except for such closure. That is to say, the recesses 21 in the shank member 13 are in the form of grooves having an open side which is closed by the platform 17.

I claim as my invention:—

1. A wheel mount comprising a harp member having means for supporting a trolley wheel on the upper portion and having on the lower portion a pair of spaced platforms, and a shank member having a head portion fitting between the said platforms, and having a pair of recesses for springs, and a pair of springs having their body and rear portions housed in the said recesses and having the front ends in abutment with the said harp member and one of the said platforms serving as a closure for the said recesses.

2. A wheel mount comprising a harp member having a platform provided on the upper side with means for operatively supporting a trolley wheel, a shank member having a head portion pivotally connected to the said platform, and a pair of cushioning springs positioned one on each side of the axis, and located in a plane at right angles to the said axis and means provided for housing the said springs below the said platform.

3. A stem having a head with a bearing surface and with cheek pieces projecting laterally trerefrom, a trolley harp having a bearing surface to rest against that on said stem, a pivot uniting said parts, said cheek pieces having spring sockets located on diametrically opposite sides of said pivot, projections on the part overlying said sockets, and springs located within said sockets and thrusting outwardly against said projections.

4. A stem having a head with flat bearing surfaces on opposite sides thereof, a hub portion and cheek pieces and with an opening through said hub portion and sockets in said cheek pieces, a harp including a base with a flat bearing surface to fit the bearing surface on one side of the head, a bridge extending from said base and terminating in a strap having a flat bearing surface to fit the opposite side of said head with lateral projections from said bridge, springs located in said sockets and thrusting against said projections, a bolt passing through said base and strap to pivotally unite the parts, and supporting arms projecting from said base.

FRED I. HODGE.

Witnesses:
 LOUIS M. SCHMIDT,
 ROGER W. EDWARDS.

Copies of this patent may be obtained for five cents each, by addressing the "Commissioner of Patents, Washington, D. C."